United States Patent

[11] 3,605,012

[72] Inventor Jacob H. Kubanoff
Philadelphia, Pa.
[21] Appl. No. 841,825
[22] Filed July 15, 1969
[45] Patented Sept. 14, 1971
[73] Assignee The United States of America as represented by the Secretary of the Army

[54] NOISE CANCELLATION FILTER SYSTEM
3 Claims, 4 Drawing Figs.

[52] U.S. Cl. 324/78 F, 328/165, 325/473
[51] Int. Cl. G01r 23/02, H04b 1/10
[50] Field of Search 324/78 F; 328/165; 325/473, 475, 476

[56] References Cited
UNITED STATES PATENTS
3,103,009 9/1963 Baker 325/473

*Primary Examiner*—Alfred E. Smith
*Attorneys*—Harry M. Saragovitz, Edward J. Kelly, Herbert Berl and S. Dubroff

ABSTRACT: There is provided a system which detects a desired signal in the presence of random noise. A plurality of filters having successively adjacent passbands simultaneously receive a composite of noise and desired signal. Each filter passes only that portion of the composite within its respective passband. All portions are then integrated and thereafter alternate portions are inverted. Inverted and noninverted portions are then summed, the desired signal, if present, appearing as a residue. Sensing indicators connected to each summer output then indicate within which filter the desired signal appeared.

INVENTOR.
JACOB H. KUBANOFF
Harry M. Saragovitz
BY Edward J. Kelly
Herbert Berl
S. Dubroff ATTORNEYS:

INVENTOR.
JACOB H. KUBANOFF.
BY Harry M. Saragovitz
Edward J. Kelly
Herbert Berl, S. Dubroff
ATTORNEYS.

NOISE CANCELLATION FILTER SYSTEM

STATEMENT OF GOVERNMENT INTEREST

The invention described herein may be manufactured, used, and licensed by or for the Government for governmental purposes without the payment to me of any royalty thereon.

BACKGROUND OF THE INVENTION

This invention relates to a signal recognition system, and more particularly, to a system which is useful in detecting and extracting an intelligence signal in a background of random noises.

Virtually all electronic systems are susceptible (in greater or lesser degrees) to the presence of noise. It has therefore become desirable to provide noise cancellation techniques so that a desired signal, masked or buried in the noise, may be readily detected. In general, there have been two basic attempts to eliminate random noise from an electronic system. One of these contemplates the use of a very narrow band-pass filter (for example, from 488–520 cycles per second) when expecting a signal at the center of the band (for example, 500 cycles per second). With such a narrow bandpass, the signal to noise ratio is substantially higher than would be the case if the bandpass were larger. Accordingly, it becomes relatively easy to extract the signal from such a filter. The problem with this technique, however, is that it is imperative that the frequency of the incoming signal be known. Frequencies other than substantially the center frequency of the band-pass filter are masked by the noise hence are not detected.

A second approach to noise cancellation has been the utilization of an extremely long time constant integrator which, in theory, would have an infinite time constant. This technique is based upon the premise that there is as much positive energy in a noise signal as there is negative energy and that after an infinite period of time the average obtained by the integrator would be zero noise. Of course, this technique presupposes the luxury of having a substantially long time period available to await the desired signal. Such a luxury is not available in practice, especially where a number of signals are being received sequentially.

Accordingly, there has arisen a need for an electrical filter system which is capable of cancelling noise both rapidly and irrespective of a knowledge of the frequency of the desired signal.

It is therefore the general purpose of the present invention to provide a noise cancellation system which virtually instantaneously cancels noise over a wide frequency spectrum and simultaneously detects and extracts any signal appearing in that spectrum. The invention also has the capability of identifying, with a relatively narrow band, wherein the signal frequency actually lies.

SUMMARY OF THE INVENTION

The noise cancellation filter system eliminates noise by dividing the noise spectrum into quantized units. Then by changing the polarity of the potential stored in each alternate quanta and summing adjacent pairs, the noise, (which is equally distributed in each quanta) is cancelled and any residue remaining in the intelligence signal. Thus, the premise upon which the system relies in the fact that random noise is evenly amplitude distributed across the frequency bands of interest while any signal information or intelligence is present at discrete frequencies with its amplitude polarity being either positive or negative. Therefore, by summing positive and negative compositive signals in the frequency bands of interest, the random noise is substantially subtracted out while the desired signal remains unaffected. More definitively, if it is postulated that noise is evenly distributed over a region in which a desired signal is expected to appear, then if a relatively narrow band of frequencies are monitored, that noise will be distributed evenly across the region. Thus, from moment to moment, the region is full of noise signals whose amplitudes are equal and statistically distributed. A group of filters each having a narrow bandpass may then be distributed so that as a total filter system their combined bandpasses will cover the total bandwidth of interest, the power in each of these filters being subtracted from that of its neighbor. If noise only is present in all filters, subtracting their power simply causes the noise to yield a total of zero. However, if one of these filter segments contains a signal in addition to noise, the signal remains as residue and is not cancelled by the subtraction process. This may be achieved by feeding a composite input comprising a desired signal and random noise into a plurality of band-pass filters having different band-pass characteristics (which may be adjacent to one another) and which cover the range of frequencies of interest. The bandwidths of these filters are the same although each covers a different portion of the frequency spectrum. The output of all filters are individually integrated and selected ones thereof are thereafter inverted by a unity gain invertor to provide negative outputs. The resultant positive and negative outputs are then summed in pairs to provide a resultant output signal. If two adjacent filters contained only noise, then the summing process provides a zero resultant signal. If, however, a signal is present in one of the filter bands the summing process provides only the desired signal as a residue thereby providing a means of detection. Also provided are positive and negative sensing means and indicators therefor connected to receive the residue signal and to indicate the frequency band, wherein it appeared.

DESCRIPTION OF THE PREFERRED EMBODIMENT

Figures 1, 3A, 3B:
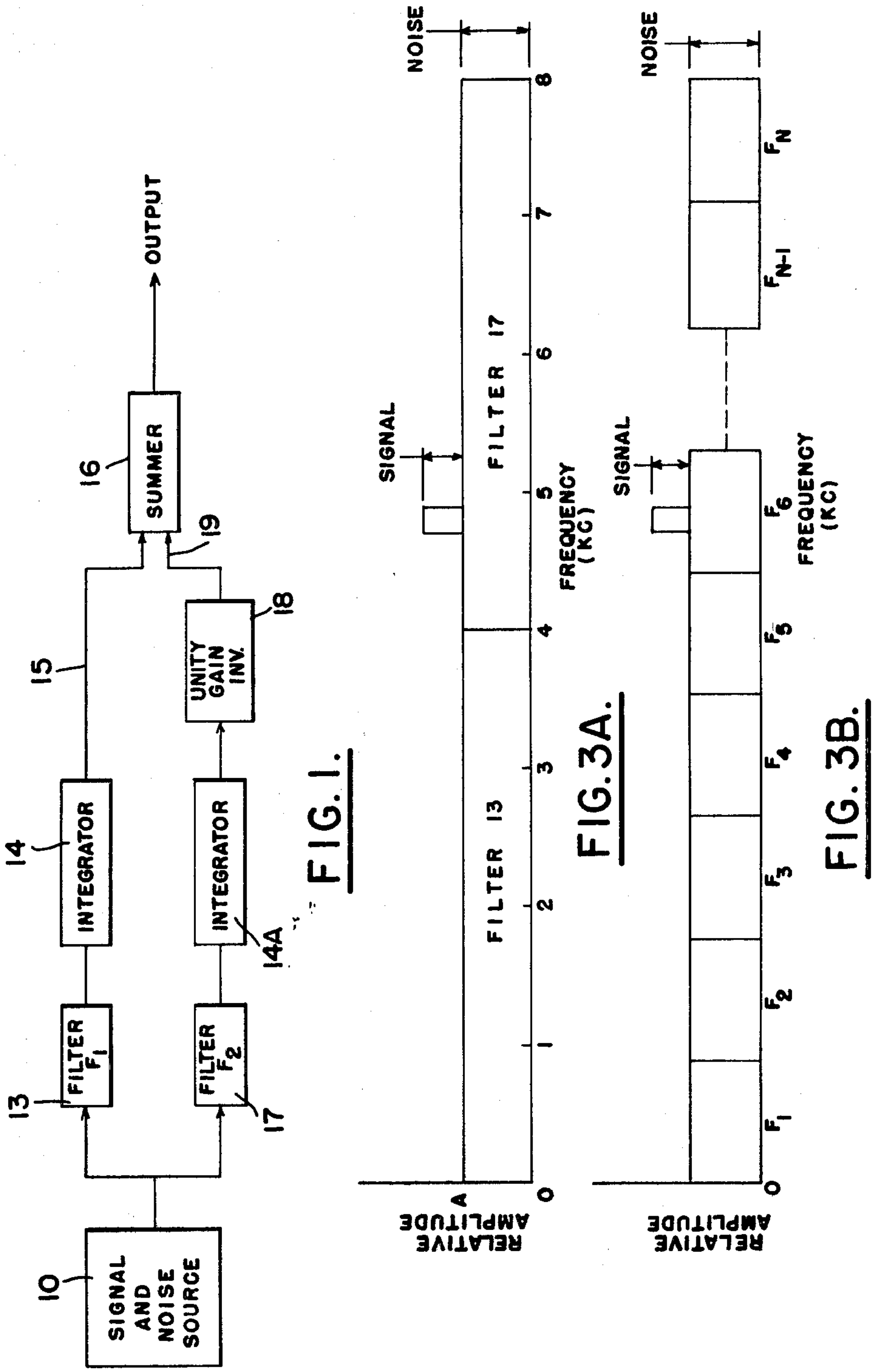
FIG. 1 is a blocked diagram of the noise cancellation system illustrative of the manner in which the invention may be practiced.
FIGS. 3A and 3B are graphical signal and noise representations utilizable for explanation purposes with FIGS. 1 and 2, respectively.

Referring now to the drawings, and more particularly to FIG. 1 thereof, there is shown a signal and noise source 10 feeding simultaneously band-pass filters 13 and 17. Source 10 is illustrative only and may comprise, for example, a return radar signal. For ease of illustration, it may be assumed that source 10 is any source and that an information signal, if present therein, will occur somewhere within the wide frequency band of 0–8,000 cycles. Filter 13 may be a standard commercially available filter having a bandpass from approximately 0–4,000 cycles with a 24 db./octave rolloff. The output of filter 13 is connected to an RC integrator 14, the output of which is connected, via the lead 15, to a summer 16. Filter 17 may also be a commercially available filter having a 24 db./octave rolloff. However, the bandpass of this filter is 4,000–8,000 cycles. Filter 17 is connected at its output to a like integrator 14A, the output of which is connected to a unity gain inverter 18. This invertor may comprise, for example, a phase inverting operational amplifier having a gain of 1. The output of inverter 18 is connected to the summer 16 via the lead 19. The summer output may be connected to a utilization device (not shown) such as a display.

Referring now to FIG. 3A, in addition to FIG. 1, the system operation will be explained. FIG. 3A is a graph ideally representing the band-pass characteristics of, respectively, filters 13 and 17. The area under the curve represents the total power in each filter. As can be seen from FIG. 3A, the power in filter 13 is illustrated as being pure noise whereas the power in filter 17 is illustrated as having pure noise and signal present therein somewhere between 4,000 and 8,000 cycles. It is desired to detect this signal with the system of FIG. 1. This is done as follows. Signal and noise source 10 is providing a composite signal varying from 0–8,000 cycles per second into, respectively, filters 13 and 17. Both filters, since they are of like bandwidth, pass the same number of cycles (4,000 in the example) and since the noise has been assumed to be equally distributed throughout the 0–8,000 cycle band, the output from both filter 13 and filter 17 in the absence of a desired signal would be like DC levels (shown at "A" in FIG. 3A). These two levels would then be integrated by, respectively, filters 14 and 14A. The integration process initially starts as a charging ramp function, but due to the capacitors within the integrators holding the charge, the function levels off to provide a threshold for each integrator. The output from each integrator is therefore also a DC level which in the absence of a desired signal would be equal in amplitude for both integrator 14 and integrator 14A. Accordingly, if these two levels are summed after one of them is inverted by unit gain inverter 18, the resultant output signal from the summer 16 would be zero. However, if there is an information signal present in either of the two filter bands, and since it is greater amplitude than the noise, then upon inversion and summation only the information signal will remain as a residue. If the residue signal is inverted then it is known that the signal appeared in filter 17 and therefore occurred somewhere between 4,000 and 8,000 cycles. Conversely, if the residue is not inverted then it is known that the signal appeared between 0 and 4,000 cycles.

Figure 2:
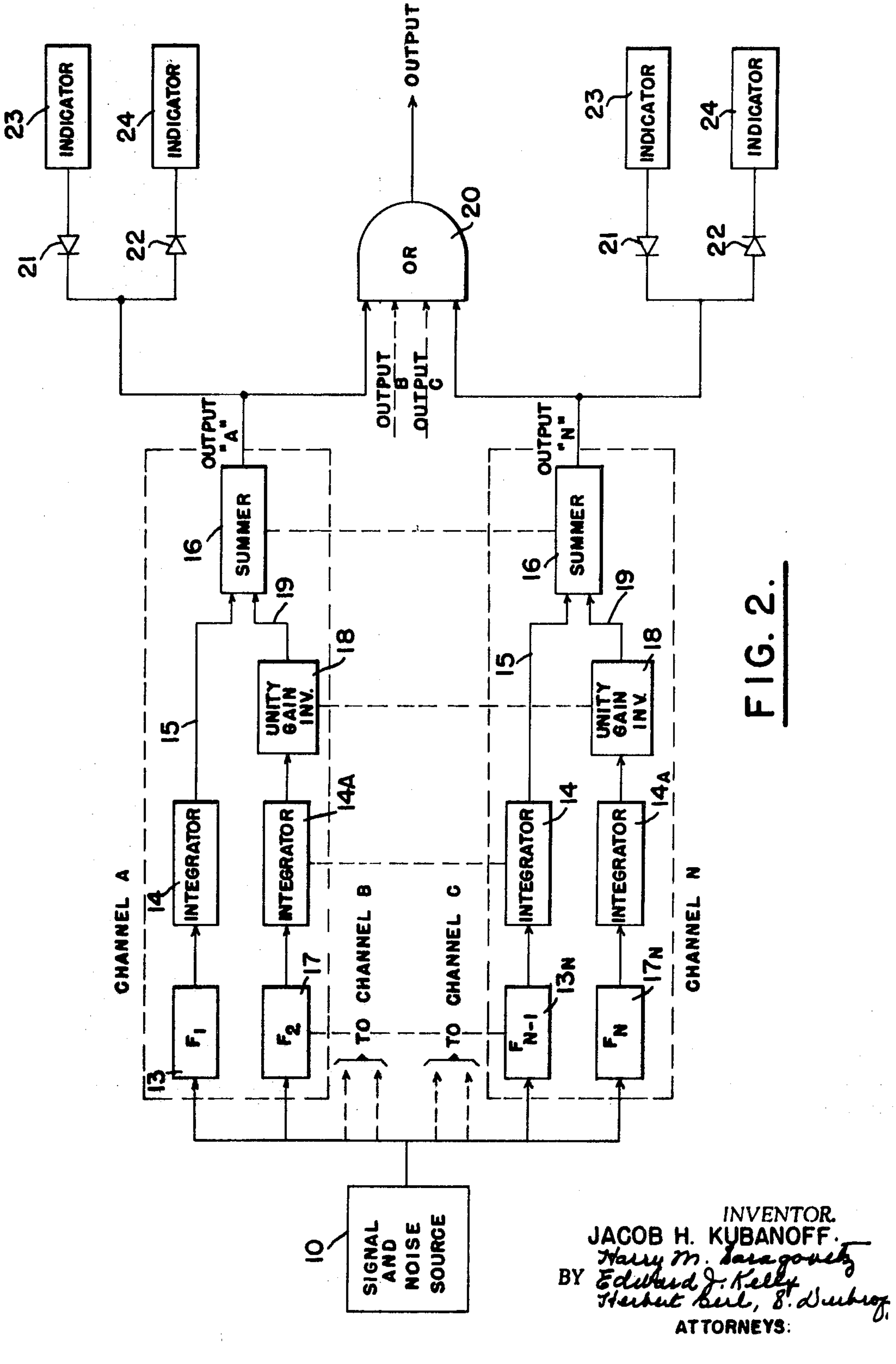
FIG. 2 is a more detailed embodiment of the invention utilizing the principles of FIG. 1 but providing more accurate results than obtainable with the FIG. 1 embodiment.

Since it is desirable to define the frequency of the desired signal with greater accuracy than is readily achievable with the system of FIG. 1, the system of FIG. 2 has been provided. Also, since in FIG. 2, the signal to noise ratio is increased, desired signal detection is likewise enhanced. FIG. 2 comprises a plurality of channels each channel being composed of the elements of FIG. 1. As shown, FIG. 2 comprises channels A through N inclusive, each channel having two filters therein and each filter being respectively adjacent in band-pass characteristics to that of its succeeding neighbor. This is shown graphically in FIG. 3B wherein each filter may be assumed to have a bandpass of 1,000 cycles per second. Connected to the output of each channel is an OR gate 20. Also connected to each channel output are a pair of like back and forward biased diodes 21 and 22, respectively. Connected to the diode 21 is an indicator 23, which may be a neon lamp. Similarly, connected to the diode 22 is a like indicator 24.

With the additional channels the system of FIG. 2 is substantially more accurate than that of FIG. 1 but is merely an extension of the principle utilized therein. As can be seen from FIG. 3B, the signal to noise ratio for a given filter is substantially increased since the bandwidth is reduced without reducing the signal. This assures that a signal which might otherwise be swamped or masked with the system of FIG. 1 is detected with the system of FIG. 2 (provided it is of sufficient amplitude) and that the frequency of the detected signal is determinable within narrow, constrained limits.

In operation, the system of FIG. 2 is substantially identical with that of FIG. 1. Source 10 provides the composite to the plurality of filter channels. Each filter therein passes only the information permitted by its pass band and the output of each of the channels is routed through OR gate 20 which passes the information present in the active channel. In all of those filter bands wherein no signal appears the respective summers 16 will provide a zero output. Accordingly, neither OR gate 20 nor any of the indicators will be activated. However, that channel wherein a desired signal is present will provide a residue output as discussed with respect to FIG. 1 and will therefore be operative to enable OR gate 20. The amplitude of the residue signal will be positive or negative depending upon in which filter band it appeared. If the signal appeared in channel path in which no inversion exists then diode 22 would permit its passage indicator lamp 24 would light. Conversely, if the signal appeared in other channel path where the signal is inverted then indicator 23 would light upon the signal passed by diode 21. Since each channel is provided with positive and negative indicators, and further since the residue signal, if any, must appear in only one channel, a responsive indication on a particular indicator defines the filter wherein the signal was passed. Accordingly, as shown in FIG. 3B, if the signal appears in filter F6 then the indicator 23 connected to channel C would be enabled and the presence of the residue signal would therefore be ascertained. The frequency thereof would also be ascertainable as being within the pass band of filter F6.

It has thus been shown that the present invention cancels noise otherwise present in a received signal containing both noise and desired signal. The invention detects both the presence of the desired signal and the frequency thereof with an accuracy limited only by the number of filtered channels utilized.

I wish it to be understood that I do not desire to be limited to the exact details of construction shown and described, for obvious modifications will occur to a person skilled in the art.

I claim:

1. A noise cancellation circuit for separating the intelligence portion from the noise of a transmission within a frequency spectrum which circuit comprises:
   - a plurality of channels, each channel having connected therein;
   - a first band-pass filter for passing only therethrough a first narrow frequency band,
   - a second band-pass filter for passing only therethrough a second narrow frequency band equal in bandwidth to and frequency contiguous said first narrow frequency band and having a common boundary therewith, wherein each of said channels encompasses a different region of said frequency spectrum,
   - a pair of identical integrators,
   - an inverter,
   - a summing means having a pair of inputs and one output for providing an output signal which is the sum of the input signals,
   - a first circuit path having connected in series therein said first band-pass filter, one of said integrators and one input of said summing means,
   - a second circuit path having connected in series therein said second band-pass filter, the other of said integrators, said inverter, and the other input of said summing means,
   - whereby, when said transmission is applied simultaneously to the inputs of said filters the output of said summing means will be only said intelligence portion.

2. The noise cancellation circuit according to claim 1 further including an OR gate having a plurality of inputs each connected to receive the output of one of said summing means.

3. The noise cancellation circuit according to claim 2 further including for each channel:
   - a pair of visual signal indicators connected to receive the output of said summing means,
   - a pair of diodes each connected intermediate said summing means and one of said indicators but of a polarity orientation whereby current will flow only in one direction to one of said indicators and in the opposite direction to the other of said indicators.